United States Patent

Hausmann et al.

[11] Patent Number: 5,912,084
[45] Date of Patent: Jun. 15, 1999

[54] PACKAGING SEAL LAYER

[75] Inventors: Karlheinz Hausmann, Neuchatel; Hans Dieter Flieger, Vessy; Heiko E. Schenck, Collex-Bossy, all of Switzerland; David R. Sparrow, Leicester, United Kingdom

[73] Assignee: E. I. du Pont de Nemours and Company, Wilmington, Del.

[21] Appl. No.: 08/776,697

[22] PCT Filed: Aug. 9, 1995

[86] PCT No.: PCT/US95/10112

§ 371 Date: Feb. 5, 1997

§ 102(e) Date: Feb. 5, 1997

[87] PCT Pub. No.: WO96/05056

PCT Pub. Date: Feb. 22, 1996

[30] Foreign Application Priority Data

Aug. 10, 1994 [EP] European Pat. Off. .............. 94202300

[51] Int. Cl.$^6$ ........................... B32B 27/28; B32B 27/32; B32B 27/34; B32B 27/36
[52] U.S. Cl. ...................... 428/476.3; 428/483; 428/515; 428/516; 428/520; 428/522; 525/240; 525/298
[58] Field of Search ..................................... 428/515, 516, 428/520, 523, 212, 476.3, 483, 522; 526/327; 525/56, 57, 240, 298

[56] References Cited

U.S. PATENT DOCUMENTS

| 3,879,492 | 4/1975 | Bontinick | 260/857 D |
|---|---|---|---|
| 4,247,584 | 1/1981 | Widiger et al. | 428/35 |
| 4,361,237 | 11/1982 | Heiremans et al. | 206/631 |
| 4,678,713 | 7/1987 | Lancaster et al. | 428/421 |
| 4,778,856 | 10/1988 | Chen et al. | 525/190 |
| 5,089,556 | 2/1992 | Tabor et al. | 525/64 |
| 5,126,176 | 6/1992 | Blaskovitz et al. | 428/36.92 |

FOREIGN PATENT DOCUMENTS 0 192 131 B1  3/1991  European Pat. Off. .......... B32B 7/06

*Primary Examiner*—Paul Thibodeau
*Assistant Examiner*—D. Lawrence Tarazano
*Attorney, Agent, or Firm*—Craig H. Evans

[57] ABSTRACT

A seal layer formed from a thermoplastic polymer blend comprising (a) a non-polar, non-ionomeric polyolefin, and (b) a polar ethylene copolymer having carbon monoxide functionality, and its use to adhere adjacent thermoplastic films together to form a package. Since the bonding strength of the thermoplastic films to one another and to the seal layer is greater than the internal cohesion strength of the seal layer itself, the seal layer provides for an easy open package.

11 Claims, No Drawings

PACKAGING SEAL LAYER

The present invention relates to a peelable seal layer formed from blends of polar and non-polar polyolefins, such peelable seal layers being useful for adhering adjacent thermoplastic films together to form a package. Such packaging is easy to open by pulling the adjacent films apart due to the relative ease in rupturing the seal layer.

More particularly, the present invention relates to a peelable seal layer formed from a thermoplastic polymer blend comprising (a) a non-polar, non-ionomeric polyolefin and (b) a polar ethylene copolymer having carbon monoxide functionality, and its use to adhere adjacent thermoplastic films together to form a package. Since the bonding strength of the thermoplastic films to one another and to the seal layer is greater than the internal cohesion strength of the peelable seal layer, the peelable seal layer provides for an easy to open package.

BACKGROUND OF THE INVENTION

A wide variety of products, particularly perishable food products are sealed in packages using thermoplastic films sealed by vacuum skin packaging, thermoforming or other processes. In vacuum skin packaging, a product is placed on a support of a film or of a tray of relatively rigid material and, by differential air pressure, a heated thermoplastic film above the product is molded down upon and around the product and against the support, the space between the upper film and the support having been evacuated. The heated film forms a tight skin around the product and is sealed to the support.

In the thermoforming process the thermoplastic film is sealed to the flange-like edges of the support using heated sealing bars or similar equipment.

Other packaging processes for which the packaging material employs the peelable seal layer of the present invention include packaging in vertical or horizontal form-fill machines, as used in cereal packages and the like.

A problem that is encountered in these types of packaging is that the heated thermoplastic film seals so strongly to the support that it is difficult to separate them from each other in order to open the package. An easy to open package of this type should be easily openable by manually pulling apart the two films, normally starting from a point like a corner of the package where the film has purposely not been sealed to the support. In this manner the use of scissors, a knife or other devices to open the package can be avoided.

A packaging material described in EP 0 192 131 B1, which addresses this problem consists of an upper and lower web of a thermoplastic material and a seal layer disposed there between and adhered to each of the opposite surfaces of the two webs, the adhesive seal strength of the seal layer to the first and second surfaces being greater than its internal cohesive strength. To break the seal of such packages, the upper and lower webs are peeled apart manually, during which time the seal layer separates due to internal cohesive failure, whereby portions of the seal layer are left on the first and second surfaces.

The seal layer in these types of packaging materials can be a blend of an ionomer and a modified ethylene-vinyl acetate copolymer. While these materials work well, they have the disadvantage that ionomers tend to be relatively costly in comparison to other thermoplastics, therefore commercially unattractive for certain end-uses.

Accordingly, it is an object of the present invention to provide a lower cost alternative polymer blend for use as a peelable seal layer in packaging. More particularly, it is an object of the present invention to provide a peelable seal layer formed from a thermoplastic polymer blend comprising (a) a non-polar polyolefin and (b) a polar ethylene copolymer having carbon monoxide functionality; whereby component (b) is present in the blend in a weight range between 1 and 90%; and to provide a packaging material comprising the peelable seal layer and a thermoplastic film.

DETAILED DESCRIPTION OF THE INVENTION

Certain terms used herein have the following meanings.

"Non-polar, non-ionomeric thermoplastic polyolefin" means any polyolefin polymer which is thermoplastic but which excludes polar ethylene copolymers and ionomers, as defined herein. Useful polyolefins homopolymers include various polyethylenes, e.g. high density polyethylene (PE-HD), low density polyethylene (PE-LD), very low density polyethylene (PE-VLD), linear low density polyethylene (PE-LLD), as well as polypropylene. Suitable polyolefin copolymers include copolymers of ethylene and a vinyl ester of an alkanoic acid (e.g. vinyl acetate) or an ester of an ethylenically unsaturated carboxylic acid (e.g. methyl acrylate, ethyl acrylate etc.).

Component (a) may also be a polypropylene (PP), which, as used herein, includes homopolymers of propylene as well as copolymers of polypropylene which can contain about 1 to about 20 weight percent ethylene or an alpha olefin comonomer of 4 to 16 carbon atoms. The polypropylene can be highly crystalline isotactic or syndiotactic polypropylene. The copolymer can be either a random or block copolymer. The density of the PP or copolymer can be from about 0.88 to about 0.92 g/cc; generally, from about 0.89 to about 0.91 g/cc.

PE-HD useful as a polyolefin resin of this invention, has a density of about 0.941 to about 0.965 g/cc. PE-HD is an established product of commerce and its manufacture and general properties are well known in the art. Typically, PE-HD has a relatively broad molecular weight distribution, characterized by the ratio of weight average molecular weight to number average molecular weight of from about 20 to about 40.

PE-LD, as used herein, means both low and medium density polyethylene having densities of about 0.910 g/cc to about 0.940 g/cc. The terns include linear polyethylene as well as copolymers of ethylene which are thermoplastic resins, but non-polar.

PE-VLD, as used herein, means polyethylene having a density below about 0.910 g/cc and includes linear polyethylene as well as copolymers of ethylene which are thermoplastic resins, but non-polar.

PE-LLD is a class of low density polyethylene characterized by little, if any long chain branching, in contrast to conventional PE-LD. The processes for producing PE-LLD are well known in the art and commercial grades of this polyolefin are available. The term PE-LLD means copolymers of ethylene and other alphaolefins such 1-octene, which tend to form clear films that are suitable for packaging applications.

Blends of the aforementioned homopolymers and copolymers may also be used in the invention.

Preferred component (a)'s according to the invention are PE-LD, PE-LLD and ethylene vinyl acetate (EVA).

"Ionomers", which are not included within the scope of the thermoplastic polyolefins defined for component (a), are well known thermoplastic materials, and may be described as copolymers containing ethylene and an olefinically unsaturated organic acid such as acrylic or methacrylic acid, wherein the acid is neutralized in whole or in part to produce a salt; c.f, for example US. Pat. Nos. 3,264,272, 3,404,134, 3,355,319 and 4,321,337.

Component (b) of the thermoplastic blend according to the invention is a polar ethylene copolymer having carbon monoxide functionality. Useful such copolymers are described in U.S. Pat. No. 3,780,140.

These polar ethylene copolymers preferably consist essentially of ethylene, carbon monoxide and, optionally, one or more termonomers which are copolymerizable ethylenically unsaturated organic compounds. Such termonomers are selected from the class consisting of unsaturated mono- and dicarboxylic acids of 3–20 carbon atoms, esters of such unsaturated mono-or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds.

In particular, these copolymers consist essentially of, by weight, (1) 30–80% ethylene (preferably 55–75%), (2) 2–30% carbon monoxide (preferably 5–15%) and (3) 0–60% of one or more termonomers copolymerizable therewith to produce solid copolymers (preferably 20–50%). More preferred copolymers include those in which the termonomer is vinyl acetate or an alkyl (1–8 carbons) acrylate or alkyl methacrylate (particularly n-butyl acrylate).

Preferred component (b)'s according to the invention are ethylene-butylacrylate-carbon monoxide (EnBACO), ethylene-vinyl acetate-carbon monoxide (EVACO) and ethylene-carbon monoxide (ECO).

Component (b) will be present in the blend in a weight ratio between 1 and 90%, more preferably 3 to 20%.

The thermoplastic films, which are sealed together using the peelable seal film according to the present invention, may be the previously defined olefinic polymers of component (a), as well as polyesters, polyamides and other thermoplastic polymers. Preferred thermoplastic webs will be made of low density polyethylene (PE-LD).

The resistance of the seal layer to peeling from the surface of the thermoplastic film is preferably about 1–12 N/15 mm, as measured according to ASTM D882.

The thermoplastic polymer blend according to the invention can be made by convention blending techniques. For example, they may be mixed in pellet form and then melt extruded.

The thickness of the seal layer is preferably in the range of about 5 to 60 $\mu$m, more preferably 6 to 20 $\mu$m.

The thickness of the thermoplastic film to which is adhered the seal layer is preferably in the range of about 10 to 100 $\mu$m, more preferably 20 to 50 $\mu$m.

The peelable seal layer may be applied to the thermoplastic film by conventional coextrusion processes to form packaging material.

EXAMPLES

Thermoplastic blends for peelable seal layers according to the present invention are prepared as followed.

Preparation

Three different types of films can be produced:

a. Monolayer blown film
b. Multilayer blown film for lamination
c. Multilayer blown film with barrier The above films are produced in the following way:

a. Monolayer blown film

Blends of thermoplastic resin pellets indicated in Table 1 are tumble blended and fed into a 30 mm laboratory Brabender Plasticoder extruder (PL 650) with a L/D ratio of 24 and equipped with a laboratory blown film unit Model 840805. The processing temperature is set at about 210° C. Peelable seal layers are extruded having a thickness of from 60–100 mm.

The extruded seal layers and the coextruded film for lamination produced on the standard, full scale blown film line are supported on oriented PET lidding film (12 $\mu$m in thickness). The coextruded films with barrier are used directly in a way that the films are sealed against themselves in a fashion such that the peelable seal layer is positioned between the PET film at the indicated temperatures using a heat sealing machine (Kopp PK-110). Under fixed standard conditions (0.4 mPa pressure, 1 sec. dwell time) for each temperature (from 90° C. to 160° C.) the samples are produced.

b. Multilayer blown film without barrier

Using a standard production type of blown film line and extruders (extruders: 3×50 mm Reifenhauser, Smooth barrel/3 zones heating/cooling plus 1 heating zone; screw: LJD 26, with mixing head, length 4 D, feed zone length 8.8 D, compression ratio 3.5; die: three layers, Bermag, 200 mm, rotating, spiral design, die gap: 0.9 mm; airring: dual lip design, Western) the peel blend is coextruded with polyolefins like PE-LD and PE-HD. The peel blend is produced by dry blending the thermoplastic resin peilet listed below in Tables 1 to 4.

c. Multilayer blown film with barrier

Using the same three layer die described under b. the peel blend, produced in the same way, is coextruded with PA6 (nylon 6) using a coextrudable adhesive (BYNEL* 3930 available from the DuPont Company).

TABLE 1

Monolayer Peel Blends with High Loading Compositions (parts by weight)

| | EXAMPLE | | | | | | |
|---|---|---|---|---|---|---|---|
| | 1 | 2 | 3 | 4 | 5 | 6 | Control |
| EVA[1] | 88 | 85 | 80 | | | | 100 |
| PE-LD[2] | | | | 80 | 85 | 80 | |
| EnBACO[3] | 12 | 15 | 20 | 20 | 15 | | |
| EnBACO[4] | | | | | | 20 | |

TABLE 2

Influence of the matrix resin

| Product | 1 | 2 | 3 | 4 |
|---|---|---|---|---|
| EVA[1] | 88 | 85 | — | — |
| PE-LD[2] | — | — | 85 | 80 |
| EnBACO[3] | 12 | 15 | 15 | 20 |

TABLE 3

Influence of second phase material/modifier

| Product | 1 | 2 | 3 | 4 |
|---|---|---|---|---|
| PE-LD[2] | 15% | 15% | 15% | 15% |
| EnBACO[3] | 85% | | | |
| EnVACO[5] | | 85% | | |
| EnBACO[4] | | | 85% | |
| EnBACO[6] | | | | 85% |

TABLE 4

Influence of second phase concentration

| Product | 1 | 2 | 3 |
|---|---|---|---|
| PE-LD[2] | 90 | 86 | 84 |
| EnBACO[4] | 10 | 14 | 16 |

[1]Ethylene vinyl acetate (7.5% vinyl acetate; MI = 7)
[2]Stamylan 2102 (available from DSM)
[3]Ethylene butyl acrylate (30% n-butyl acrylate; 13% CO; MI = 12)
[4]Ethylene butyl acrylate (30% n-butyl acrylate; 10% C; MI = 12)
[5]Ethylene vinyl acetate (24% Vinyl acetate; 10% CO; MI = 35)
[6]Ethylene butyl acrylate (30% n-butyl acrylate; 10% CO, MI = 8)
MI = melt index measured according to ASTM D 1238

Peel Strength Testing Method

Sealed films so produced are peeled apart in a tensile testing machine (Zwick Model 1435) in machine direction using an angle of 90° according to ASTM D882. Typical crosshead speed used is 100 mm/min. The peel forces are read from a display and are plotted. The test is repeated for all five samples and the control, and the average value is calculated, as set forth in Tables 5 to 8.

TABLE 5

Monolayer Peel Strength (N/15 mm)

| EXAMPLE | Temperature (° C.) | | | | | | | |
|---|---|---|---|---|---|---|---|---|
| | 90 | 100 | 100 | 120 | 130 | 140 | 150 | 160 |
| 1 | 0.5 | 4.3 | 6.0 | 6.2 | 6.5 | 6.5 | 6.5 | 6.5 |
| 2 | — | 3.0 | 3.1 | 3.2 | 4.2 | 4.6 | 4.8 | 4.8 |
| 3 | — | 0.6 | 2.1 | 2.2 | 2.3 | 2.5 | 2.7 | 2.9 |
| 4 | — | — | 0.4 | 1.2 | 1.5 | 1.7 | 2.0 | 2.2 |
| 5 | — | 0.5 | 1.7 | 2.4 | 2.5 | 2.8 | 2.8 | 3.2 |
| 6 | — | 0.2 | 1.3 | 2.3 | 2.4 | 2.6 | 2.9 | 3.3 |
| control | 3.8 | 6.1 | ∞ | ∞ | ∞ | ∞ | ∞ | ∞ |

∞ Could not be peeled apart

TABLE 6

Influence of Matrix Resin Peel Strength (N/15 mm)

| Load | 100° C. | 110° C. | 120° C. | 130° C. | 140° C. | 160° C. |
|---|---|---|---|---|---|---|
| a: Matrix: = ELVAX* 3120 (available ftom the Dupont Company) | | | | | | |
| 15% | 3.5 | 4.1 | 3.9 | 4.6 | 5 | 5.8 |
| 12% | 4.8 | 4.6 | 4.8 | 5.5 | 5.8 | 6.8 |
| b: Matrix: = PE-LD2, MI = 2 | | | | | | |
| 20% | 0.1 | 4 | 4.6 | 4.6 | 4.2 | 4.8 |
| 15% | 0.1 | 5.6 | 5.6 | 8.2 | 8.1 | 8.2 |

TABLE 7

Influence of Second Phase Material/Modifier (15% Load)

| Second Phase | 100° C. | 120° C. | 140° C. | 160° C. |
|---|---|---|---|---|
| EY* 4051 | 2 | 3.4 | 4.5 | 5.5 |
| EY* 741A | 1.6 | 2.1 | 2.7 | 3.3 |
| EY* 441 | 3.6 | 4.2 | 5.2 | 5.8 |
| EY* 4015 | 3 | 4 | 5 | 6.1 |

Conditions:
15% EY* load in PE-LD[2], MI = 1
EY* = ELVALOY* (available from the DuPont Company)

TABLE 8

Influence of Second Phase Concentration - Peel Strength (N/15 mm)
Influence of concentration (Second Phase - ELVALOY* HP 441)

| Load | 100° C. | 110° C. | 120° C. | 140° C. | 160° C. |
|---|---|---|---|---|---|
| 10% | 0 | 0.6 | 2.8 | 3.8 | 4.3 |
| 14% | 0 | 0.4 | 2.5 | 3.1 | 3.4 |
| 16% | 0 | 0.3 | 1.7 | 2.7 | 3 |

Conditions:
Blend of ELVALOY* HP 441 in PE-LD[2] MI = 1

Discussion of Results

The peelable seal layer ideally has a seal strength between 2 and 12 N/15 mm over a wide range of sealing temperatures. As indicated in Table 5 above, the control example demonstrates a steep and unacceptable increase in seal strength at sealing temperatures exceeding 100° C., whereas the examples according to the invention maintain good sealing level over the entire range of sealing temperatures typically encountered. In general (see Table 8), peelable seal layers containing higher levels of component (b) according to the invention will have lower seal strength.

The peel value obtained is a function of the second phase concentration. The type of ELVALOY* grade used has in general no dominating influence on the peel performance as the peel effect is related to polarity of the polymer generated by the CO group (Table 7). A more significant effect is the choice of the matrix resin (Table 7). At the same blend ratio, the peel values differ by a factor of two. Higher concentration of the modifier may compensate this effect.

We claim:

1. A seal layer for adhering adjacent thermoplastic films together to form a package that is easy to open by rupturing the seal layer when pulling the adjacent films apart, the resistance of the seal layer rupturing being about 1 to 12 N/15 mm as measured according to ASTM D882, the seal layer being formed from a thermoplastic polymer blend comprising (a) a non-polar, non-ionomeric thermoplastic selected from the group consisting of homopolymers of propylene, copolymers of propylene and ethylene, copolymers of propylene and alpha olefins having 4 to 16 carbon atoms, homopolymers of ethylene, copolymers of ethylene and vinyl esters of alkanoic acid, copolymers of ethylene and esters of an ethylenically unsaturated carboxylic acids, and blends thereof; and (b) a polar ethylene copolymer having carbon-monoxide functionality; whereby component (b) is present in the blend in a weight range between 1 and 90%.

2. A seal layer according to claim 1 wherein component (a) comprises polyethylene or ethyl vinyl acetate.

3. A seal layer according to claim 1 wherein component (b) is present in a weight range between 2 and 30%.

4. A seal layer according to claims 1 or 2 wherein component (b) comprises, by weight, (1) 30–80% ethylene, (2) 2–30% carbon monoxide and (3) 0–60% of one or more termonomers copolymerizable therewith to produce solid copolymers.

5. A seal layer according to claim 4 wherein component (b) comprises, by weight, (1) 30–80% ethylene, (2) 5–15% carbon monoxide and (3) 20–50% n-butyl acrylate or vinyl acetate.

6. A seal layer according to claim 1 wherein component (b) comprises ethylene-butylacrylate-carbon monoxide, ethylene-vinyl acetate-carbon monoxide or ethylene-carbon monoxide.

7. Packaging material comprising a easy open seal layer according to claim 1 adhered to a thermoplastic film.

8. Packaging material according to claim 7 wherein the thermoplastic film comprises a thermoplastic selected from the group consisting of polyethylene, polypropylene, polyester and polyamide.

9. Packaging material according to claim 8 wherein the thermoplastic film comprises polyethylene.

10. Packaging material according to claim 9 wherein the polyethylene thermoplastic film is selected from the group consisting of high density polyethylene, low density polyethylene, very low density polyethylene, and linear low density polyethylene.

11. A seal layer for adhering adjacent thermoplastic films together to form a package that is easy to open by rupturing the seal layer when pulling the adjacent films apart, the resistance of the seal layer to rupturing being about 1 to 12 N/15 mm as measured according to ASTM D882, the seal layer being formed from a thermoplastic polymer blend comprising (a) a non-polar, non-ionomeric thermoplastic selected from the group consisting of high density polyethylene, low density polyethylene, very low density polyethylene, linear low density polyethylene and blends thereof; and (b) a polar ethylene copolymer having carbon-monoxide functionality; whereby component (b) is present in the blend in a weight range between 1 and 90%.

* * * * *